Patented Apr. 17, 1934

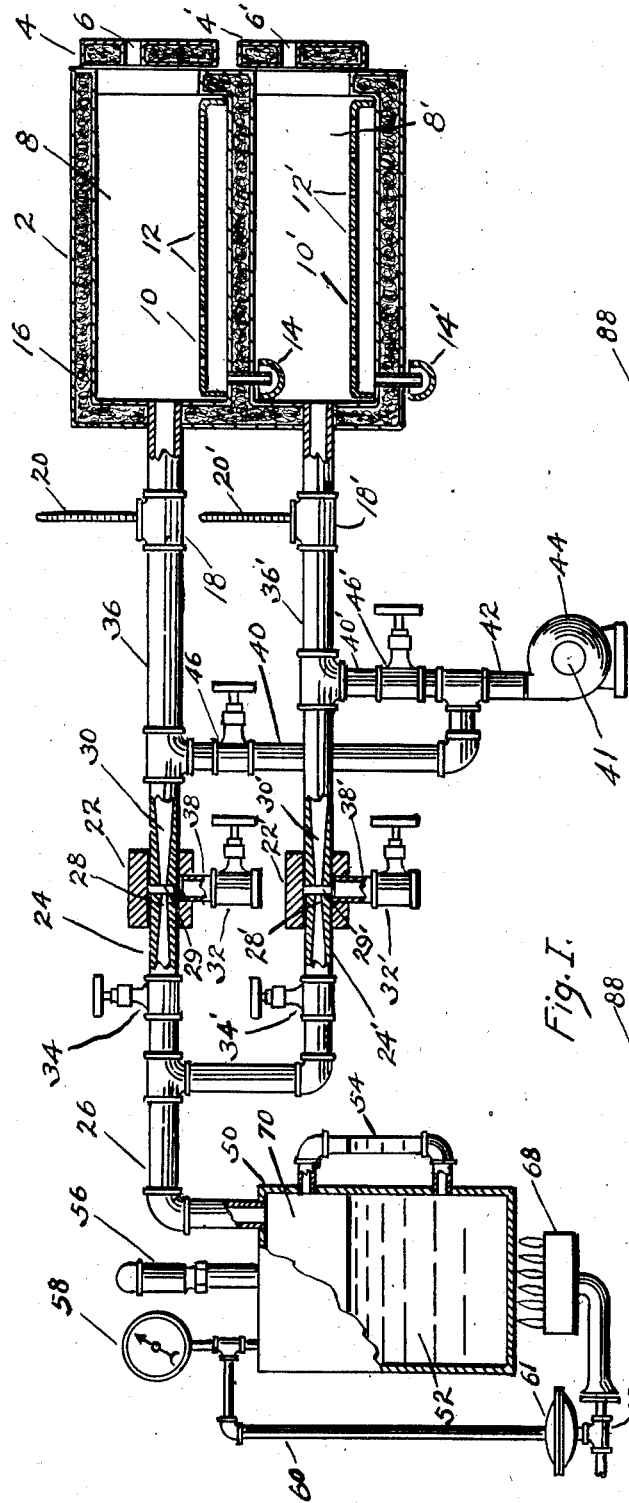

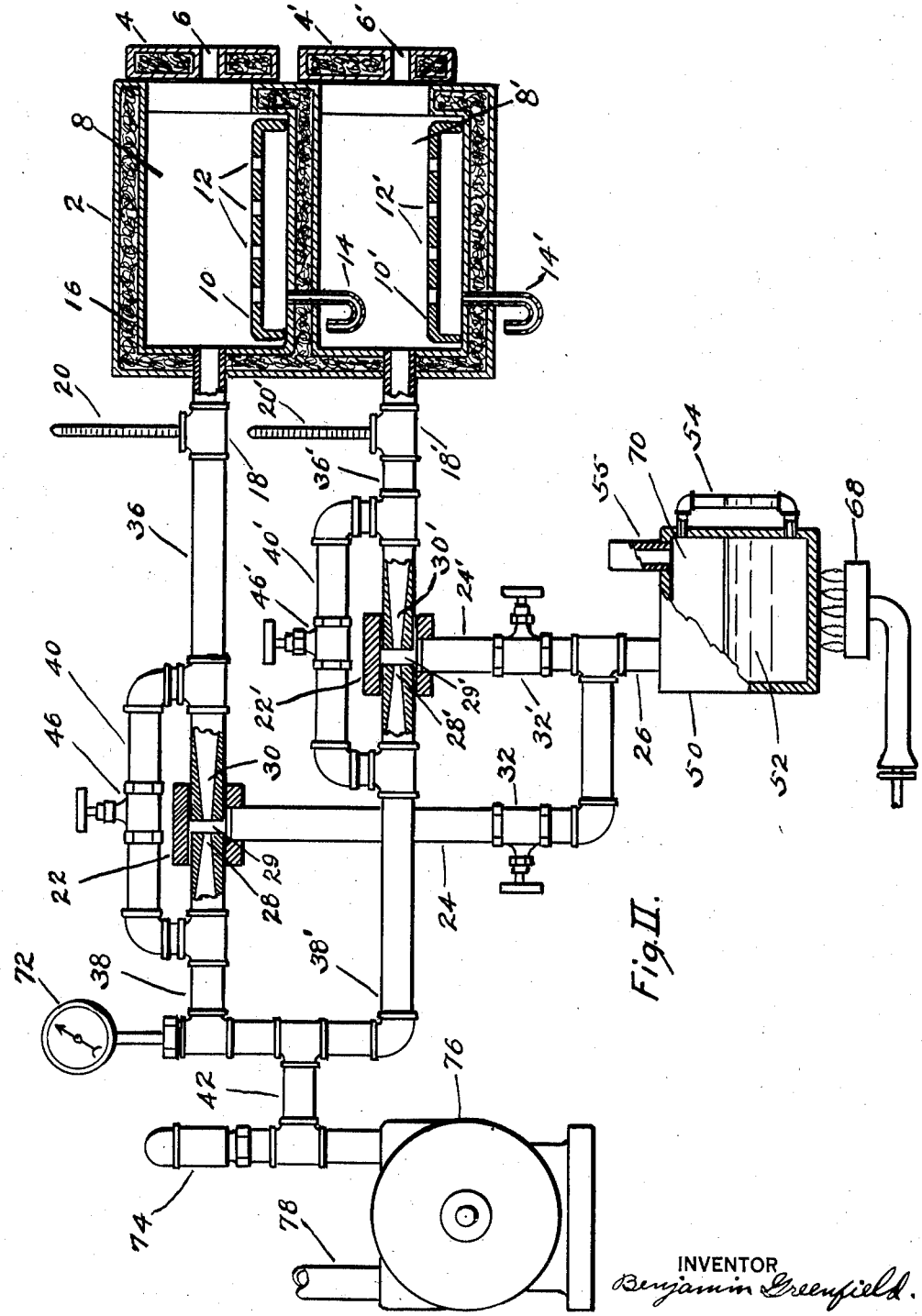
Fig. II.

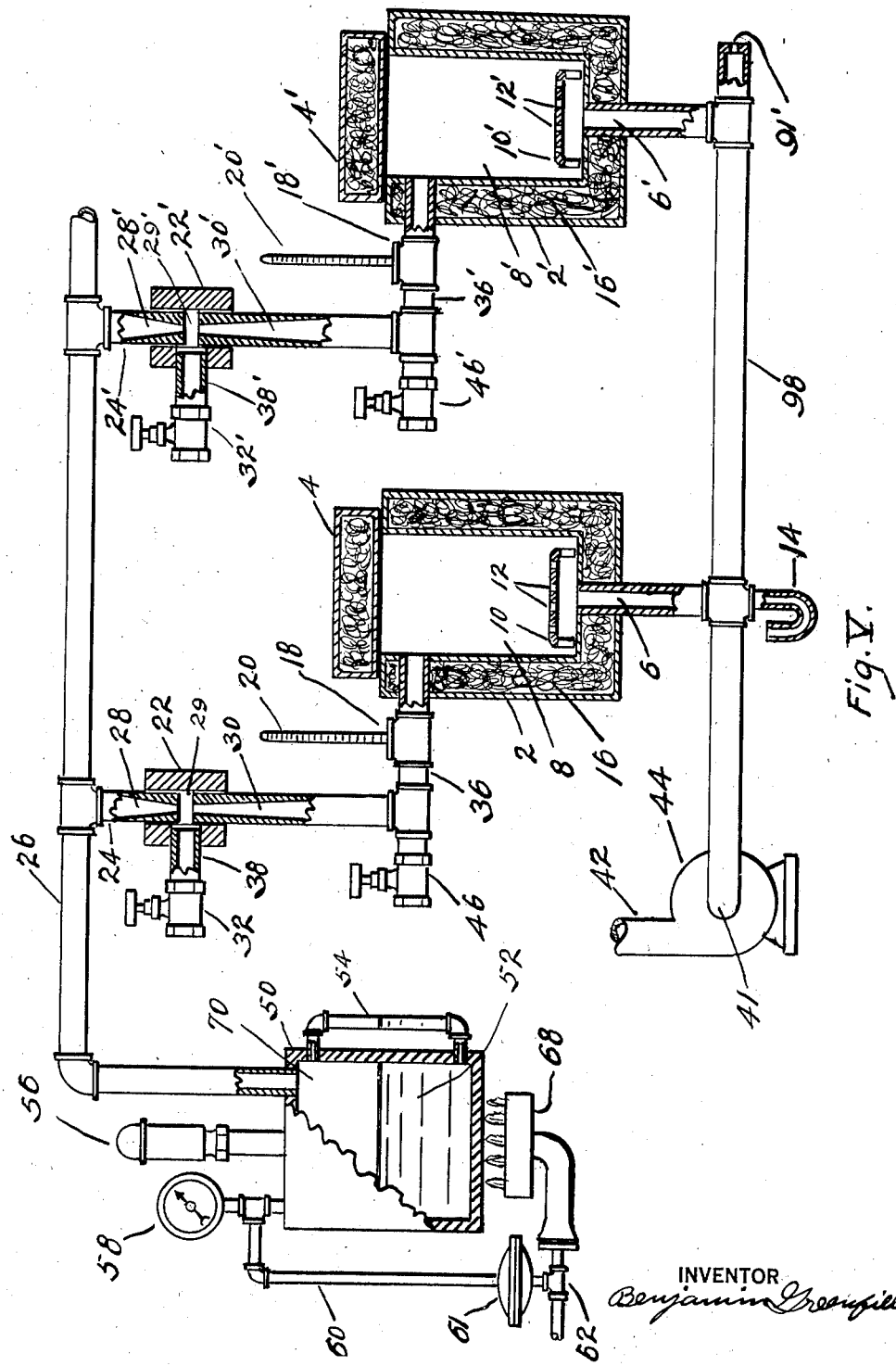

1,955,289

UNITED STATES PATENT OFFICE 1,955,289

STEAM COOKING PROCESS

Benjamin Greenfield, Elizabeth, N. J.

Application July 1, 1932, Serial No. 620,310

18 Claims. (Cl. 99—11)

My invention relates to a new method for cooking foods, and is a continuation in part of my copending application Serial No. 564,129, filed Sept. 21, 1931 and entitled Steam cooking process and apparatus.

The present invention is directed to a method for cooking foods wherein the food may be cooked at various temperatures out of contact with the fuel gases and under a flowing pressure of a premixed stream of air and steam, by allowing the cooking chamber to have continuous ventilation to the atmosphere.

Heretofore all steam cookers operating at or slightly above atmospheric pressure, produce cooking temperatures the same as, or slightly greater than that of boiling water at atmospheric pressure, which at sea level is about 212° F., whereas many cooking operations should, for best results, be carried on at temperatures of about 175° F. or 185° F. This is especially true of foods such as eggs or meats which contain large proportions of albumen, which begins to coagulate at 130° F. to 160° F. and becomes tough and horny and difficult of digestion if cooked at boiling water temperatures.

It is the principal object of the invention to provide a simple method of this character wherein various foodstuffs, such as eggs and meat, may be cooked by steam and its condensate, in which the saturated steam being introduced into the cooking chamber is first mixed in controlled amounts with controlled amounts of atmospheric air so as to produce, by the well known law of partial pressures, a mixture of superheated water vapor and air and a controlled cooking temperature less than that of boiling water at atmospheric pressure.

It is a further object of the invention to provide a method whereby saturated steam generated in one chamber at pressures slightly greater than atmospheric is caused to flow into and through the cooking chamber mixed automatically with the proper proportion of air for producing continuously and automatically the desired low-cooking-temperature.

It is a further object of the invention to provide a method whereby atmospheric air or any fixed gas delivered by suitable blower or compressor at pressures slightly greater than atmospheric is caused to flow into and through the cooking chamber mixed automatically with the proper proportions of steam for producing continuously and automatically the desired low-cooking-temperature.

Since low-temperature cooking, of necessity, takes a longer time than cooking at boiling temperature and since albumens do not begin to coagulate until a temperature of about 130° F. is reached, it is a further object of the invention to provide a method whereby the actual cooking period, at say 175° F., may be shortened by having it preceded by a prewarming period of about 125° F. designed to have the food-stuff prewarmed to and kept at 125° F. until a short time before it is to be cooked and served. After once cooked the food may also be kept warm at the lower temperature level, until it is to be served, this after warming temperature being so chosen that no further cooking of the food will take place prior to serving.

It is a still further object of the invention to provide a simple method of automatic timing whereby the normal temperature of the cooking chamber will be the prewarming temperature and whereby the duration of the higher, or cooking, temperature may be interrupted and returned to the prewarming-temperature automatically at the end of a preselected time interval to insure accurate control over the degree of cooking and then to insure that the food will stay warm, without undergoing further cooking, until served.

In general the invention provides a method for carrying on steam cooking at controlled temperatures less than the usual boiling temperatures.

The invention has these and other objects, all of which will be readily understood when read in conjunction with the accompanying drawings which show three embodiments of the invention, it being obvious that changes and modifications may be resorted to without departing from the spirit of the appended claims forming a part hereof.

In the drawings:—

Fig. I is a view, partially in vertical section, of the preferred form of the invention employing steam generated at pressures slightly greater than atmospheric for entraining the necessary atmospheric air for producing the desired cooking temperature and a low pressure blower for supplying additional air required for the lower prewarming temperature.

Fig. II is a similar view, partly in vertical section, of another form of the invention employing atmospheric air (or any other aeriform medium) at pressures slightly greater than atmospheric for entraining the necessary steam for producing the desired cooking temperature, and means for supplying as well the additional air for producing the lower prewarming temperature.

Fig. III is a view, partially in vertical section, of an automatically timed electric solenoid valve which may be substituted for valves 34 and 34' of Fig. I.

Fig. IV is a view, partially in vertical section, of an automatically timed electric solenoid valve which may be substituted for valves 46 and 46' of Figs. I, II, and V.

Fig. V is a view, partially in vertical section, of a modification of the form of the invention shown by Fig. I, in which the low-pressure blower has its inlet or suction side connected to the cooking chamber vents so as to remove all steam and air mixtures issuing from the vents, diluting it with a relative large volume of room air and also serving the further purpose of drawing in the additional air through the cooking chambers required for producing the lower prewarming temperature when valves 46 and 46' are open.

Similar numerals refer to similar parts throughout the several views.

The apparatus for employing the method of cooking disclosed herein comprises three main parts,—a steam pressure generator, an air compressor and a vented cooking chamber into which is discharged a continuous stream of a mixture of steam and air premixed in preselected proportions to produce the desired cooking temperature in the cooking chamber.

Referring to Fig. I of the drawings 50 is a steam pressure generator adapted to contain water 52 with a steam space 70 above the water level and having gauge glass 54, safety pressure release valve 56 and pressure indicating gauge 58. Associated with boiler 50 and arranged to heat the water 52 is a gas burner 68 under control of an automatic valve 62, diaphragm chamber 61 of valve 62 being connected with and making pressure tight connection with the steam space 70 of boiler 50 by means of conduit 60.

Connecting with steam space 70 of boiler 50, and making pressure tight connection, is a conduit 26 connecting with steam jet compressors 22 and 22' by means of branch conduits 24 and 24', each having stop valves 34 and 34'.

Connecting with the suction side of the steam jet compressors 22 and 22' are air inlet conduits 38 and 38', each having regulating valves 32 and 32', also conduits 36 and 36' making pressure tight connections with outlet of steam jet air compressors 22 and 22' and cooking chambers 8 and 8', 20 and 20' being thermometers arranged in T's 18 and 18' in conduits 36 and 36' to measure the temperature of the steam and air mixtures being delivered to the cooking chambers. 28 and 28' are sized steam orifices opening on one side into steam conduits 24 and 24' and on the other into and in axial alignment with discharge tubes 30 and 30', which in turn connect with conduits 36 and 36'. 29 and 29' are annular spaces connecting with air inlet conduits 38 and 38' having air inlet regulating valves 32 and 32'.

44 is an optional auxiliary air compressor or blower making pressure tight connection with conduits 36 and 36' by means of conduits 42, 40 and 40' and having air regulating valves 46 and 46'.

2 is the cooking chamber having heat insulating walls 16 and individual cooking spaces 8 and 8' which are normally closed by heat insulated doors 4 and 4', each compartment having individual sized-bleed ports 6 and 6', condensate drain traps 14 and 14' and racks 10 and 10' having perforations 12 and 12' designed to keep the food to be cooked out of contact with the bottom of each cooking compartment.

In Fig. II 76 is a positive pressure blower having air inlet conduit 78, pressure relief valve 74, pressure measuring gauge 72 and outlet conduit 42 making pressure tight connection with the inlet side of air jet compressors 22 and 22' by means of conduits 38 and 38'. The outlets of air jet compressors 22 and 22' make pressure tight connections with the cooking chambers 8 and 8' by means of conduits 36 and 36', each branch having temperature measuring thermometers 20 and 20' positioned in T's 18 and 18' for measuring the temperature of the steam and air mixture flowing through conduits 36 and 36' into cooking chambers 8 and 8' respectively.

28 and 28' are sized-air-orifices opening on one side into air conduits 38 and 38' and on the other side into and in axial alignment with discharge tubes 30 and 30', which in turn connect with conduits 36 and 36'. 29 and 29' are annular spaces connecting with steam inlet conduits 24 and 24', each having steam regulating valves 32 and 32' and making pressure tight connections with steam space 70 of steam generator 50 by means of a common conduit 26.

Associated with air jet compressors 22 and 22' are by-pass conduits 40 and 40' having by-pass regulating valves 46 and 46'.

50 is a steam generator adapted to contain water 52 with a steam space 70 above the water level and having gauge glass 54, atmospheric vent 55 and outlet steam conduit 26 making pressure tight connection between steam space 70 and conduits 24 and 24'. Associated with the boiler and arranged to heat the water 52 is a gas burner 68 or other suitable source of heat.

All details of cooking chamber 2 are the same in Fig. II as in Fig. I.

In Fig. III 34 is an automotically timed electric solenoid steam valve which may be substituted for manually operated valves 34 and 34' in Fig. I. Valve 34 has valve opening 82 normally closed by valve 87 when held to seat by the dead weight of the solenoid plunger 80 and held open by the electric solenoid coil 84 when the same is energized by electrical source of energy 88 through circuit 94 and time switch mechanism 91 to raise solenoid plunger 80, 90 being a time indicating dial and 92 a time indicating pointer operating in conjunction with the scale to preselect the time interval during which the valve will remain open.

In Fig. IV 46 is an automatically timed electric solenoid valve which may be substituted for valves 46 and 46' of Figures IV and II. Valve 46 has valve opening 82 closed by valve 83 when solenoid 84 is energized electrically but normally held open by dead weight of solenoid plunger 81, the degree of opening being determined by means of adjusting screw 85, which is threadedly engaged with the body of valve 46 and arranged to contact the under side of valve 83. 84 is an electrical solenoid coil energized by source of electrical energy 88 through electrical circuit 94 and time switch 91, details of the time switch being the same as in Fig. III.

Referring to Fig. V, all parts performing functions identical with those of Fig. I are designated with the same numerals. The only difference between the two embodiments is that in Fig. I, the discharge conduit of blower 44 is connected to the inlet sides of valves 46 and 46' so as to deliver air under pressures slightly greater than atmospheric to cooking chambers 8 and 8' through conduits 36 and 36' and thence out to atmosphere through bleed ports 6 and 6', the blower taking air on its suction side directly from the atmosphere through opening 41. In the embodiment shown by Fig. V, blower 44 discharges directly through conduit 42 to the atmosphere and takes suction through conduit 98, which conduit is connected with blower inlet 41 and cooking chamber vent conduits 6 and 6' with pressure tight connections and has air inlet opening 91' and condensate drain trap 14 for taking care of condensate which also drains out of cooking compartments 8 and 8' through vent conduits 6 and 6' into conduit 98.

Covers 4 and 4' make a pressure tight closure for cooking chambers 8 and 8' so that all air that is drawn into these chambers by blower suction must enter through either valves 32, 32', 46 or 46'. Covers 4 and 4' in Fig. V do not have vents 6 and 6' as was the case in Fig. I, but rather the vent openings 6 and 6' are placed in the bottom of the cooking compartments and perforated food racks provided for insuring that vent conduits 6 and 6' will remain unobstructed.

The operation of the various embodiments of the invention are described as follows:—

Referring to Fig. I, which shows the preferred embodiment of the invention, steam is generated at a low constant pressure in steam space 70 of boiler 50 from water 52 which is heated by the gas burner 68. Steam pressure from steam space 70 is conducted by conduit 60 to the diaphragm chamber of gas regulating valve 62 so as to regulate gas valve 62 supplying gas to gas burner 68 to maintain a constant steam pressure in steam space 70. Safety relief valve 56 functions to protect the boiler against accidental over pressure from any cause and pressure gauge 58 and gauge glass 54 to indicate the steam pressure on the steam generator and the water level in the steam generator respectively.

This saturated steam generated at constant pressure is conducted normally through conduit 26, conduits 24 and 24', stop valves 34 and 34', through steam orifices 28 and 28' of the steam jet air compressors 22 and 22' into discharge tubes 30 and 30' where it is mixed with air drawn in by aspiration or entrainment, as in an atmospheric type gas burner or Bunsen burner, through air conduits 38 and 38' and regulating valves 32 and 32' and this steam-air mixture then discharged into spaces 8 and 8' of the cooking chamber 2 and thence out to the room through bleed ports 6 and 6' after the cooking spaces 8 and 8' have been completely filled with a mixture of air and superheated steam, the temperature of the mixture being determined by the relative proportions of saturated steam and room air used in making the mixture.

Steam orifices 28 and 28' are properly sized to pass enough steam through each cooking chamber and thence out through vents 6 and 6' to the atmosphere so that the small amount of steam condensing in chambers 8 and 8' will not be an appreciable factor in changing the relative proportions of steam and air in the mixture after it has once been properly proportioned at the steam jet compressor. Under these conditions the thermometers 20 and 20' positioned in T's 18 and 18' of conduits 36 and 36' become a true index of the temperature prevailing in chambers 8 and 8' and being in a flowing stream of the steam and air mixture they serve as a temperature control which responds quickly to any change in amount of air drawn in through the regulating valves 32 and 32' by aspiration.

The law of partial pressures of fixed gases and vapors operates to give a lower temperature as more air is mixed with the steam and it is found that the steam-air ratio to bring about the desired cooking temperature less than the usual boiling point of water may be fixed at will by varying the adjustment of valves 32 and 32'. It is also found that once these valves are adjusted for a given temperature at thermometers 20 and 20', and hence also in cooking chambers 8 and 8', that small changes in steam pressure at steam orifices 28 and 28' will not materially change the temperature in the cooking chamber. This is as should be expected, for it was found in the case of the well known atmospheric gas burner that if a given rate of flow of gas issuing from an orifice under a pressure of two inches, for example, will inject two volumes of air to one of gas into a given burner and if the gas pressure is increased,—thereby increasing the gas rate,— the volume of air injected will be increased but the air-gas ratio will remain the same as it was before the change of gas pressure.

So for some applications it is not necessary that steam be generated at a constant pressure but in Figs. I and V, it is shown with constant pressure generation in these embodiments in order that it may be practical to use a second and auxiliary source of air for a purpose shortly to be described.

In certain cooking operations such as egg cooking it is not only desirable that the cooking temperature be definitely fixed at, say 175° F., but that the time of cooking be also closely regulated by suitable mechanical timing. Hence it is sometimes desirable to substitute automatically timed valves for steam valves 34 and 34'. This automatic valve is shown by Fig. III and functions to stop the flow of steam through the steam jet compressor at the end of a preselected time interval, thus to abruptly stop the flow of heat to the individual cooking compartments. The timing mechanism shown by Fig. III is the conventional spring operated type which compresses a spring to motivate the timer while simultaneously closing an electrical circuit 94 through solenoid coil 84 and source of electrical energy 88 to open valve 87 and allow steam to pass through valve opening 82 to the steam jet air compressor. At the end of the time interval determined by the position at which pointer 92 is placed on time scale 90 the pointer returns to zero on the scale and opens the electrical circuit, thus allowing valve 87 to drop to seat and stop the flow of steam to the cooking chamber.

In some applications of this low-temperature method of cooking, such as cooking eggs for serving as soon as cooked to hotel or restaurant patrons, the longer time required for low-temperature cooking is somewhat of a disadvantage, because the patron will object to waiting so long for his egg to be served after ordered cooked to some particular degree to suit his individual taste. To meet these exacting requirements it has been found that the actual time necessary to cook the egg by the low-temperature method may be much shortened if the egg is first prewarmed to a temperature of about 125° F. This is possible because the albumen of the egg does not begin to coagulate until a temperature of 130° F. is reached.

It has not been found practical to aspirate enough air with a steam jet air compressor to produce temperatures less than about 150° F. so to produce a temperature as low as 125° an auxiliary source of air is provided by means of a volume type blower 44 feeding air into conduits 36 and 36' through pressure tight conduits 42, 40 and 40' and regulating valves 46 and 46' at a point between the steam jet air compressors 22 and 22' and the thermometers 20 and 20'. Thus by first feeding a fixed amount of steam by feeding the steam at constant pressure through orifices 28 and 28', then fixing the amount of air drawn in by aspiration by adjustment of valves 32 and 32' to produce the desired cooking temperature it is then possible to produce a second preselected and still lower prewarming temperature by an auxiliary supply of air fed under control of regulating valves 46 and 46'.

If it is desired to produce a range of cooking temperatures from 212° F. by graduated steps down to, say 100°, valves 32 and 32' may be closed so that no air is drawn in by aspiration. Then any desired temperature may be produced in cooking chambers 8 and 8' by the simple expedient of the regulation of valves 34 and 34' and valves 46 and 46'.

As the apparatus will ordinarily be operated for hotel or restaurant use the apparatus will first be adjusted to the desired cooking temperature by closing valves 46 and 46', then turning the valves 34 and 34' wide open and adjusting valves 32 and 32' until the desired cooking temperatures are shown by thermometers 20 and 20', say 175° F. Then valves 46 and 46' are opened until the desired prewarming temperature, say 125° F., is shown by the thermometers 20 and 20'. Then by opening and closing only valves 46 and 46' the temperature in the cooking chambers 8 and 8' may be quickly switched from 125° F. to 175° F.

If it is desired to automatically time the cooking period at 175° F. the automatic valve shown by Fig. IV may be substituted for valves 46 and 46' of Fig. I. This valve is normally open to an amount determined by the adjustment of screw 85 which determines the amount of opening of valve disk 83 from valve opening 82 and hence determines the prewarming temperature. When the solenoid 84 is energized by the closing of electric circuit 94 by time switch mechanism 91 the flow of auxiliary air is stopped and the cooking chamber temperature is returned to 175° F. The automatic preselecting of the time during which the automatic valve is closed thus determines the duration of the cooking period. The timing mechanism is exactly the same as that shown by Fig. III but by using a reversed solenoid valve in this application the duration of time the valve is closed is determined, rather than the duration of the time the valve is to be open as in Fig. III.

In some applications where very low temperatures are desired, or where it is desired to use some aeriform medium other than atmospheric air, it may be desirable to use the aeriform medium under pressure to operate an air jet compressor to aspirate steam generated at essentially atmospheric pressure. Such a modified system is shown by Fig. II.

With this method of operating, air or any other suitable aeriform medium is drawn in through conduit 78 by compressor or positive pressure blower 76 and delivered under constant pressure to conduit 42 through pressure tight conduits 38 and 38' to orifices 28 and 28' of air jet compressors 22 and 22' into discharge tubes 30 and 30' where it is mixed with steam drawn in by aspiration or entrainment, as in an atmospheric gas burner or Bunsen burner, through steam conduits 24 and 24', regulating valves 32 and 32' and conduit 26 from steam space 70 of steam generator 50, and this steam-air mixture then passes into spaces 8 and 8' of the cooking chamber 2 and thence out to the room through bleed ports 6 and 6' after the cooking spaces 8 and 8' have been completely filled with a mixture of air and superheated steam, the temperature of the mixture being determined by the relative proportions of saturated steam and air, or any other suitable aeriform medium, used in making the mixture.

A pressure relief valve 74 is provided to regulate the pressure of the air as indicated by pressure gauge 72, the inlet of the pressure relief valve making pressure tight connection with conduit 42. To this end the capacity of the compressor is slightly in excess of that needed so that the excess air may pass to the atmosphere through constant pressure relief valve 74.

The cooking temperature, of say 175° F., is produced by the simple expedient of regulating valves 32 and 32' through which steam generated at atmospheric pressure is drawn by aspiration from steam generator 50, which is provided with atmospheric vent 55 and water level gauge glass 54, and burner 68 for supplying the necessary heat for steam generation.

Additional air, or other aeriform medium, for producing a still leaner mixture for the prewarming temperatures of say 125° F. is provided by means of bypass conduits 40 and 40' and the bypass regulating valves 46 and 46'.

If automatic timing of the duration of the cooking period is desired the automatic valve shown by Fig. IV may be substituted for valves 46 and 46' of Fig. II, where they perform the same function as in Fig. I.

The cooking chamber 2 should preferably be well insulated so that the amount of steam condensed in the chamber, as the properly preproportioned mixture of steam and air is passed through the cooking chamber and out bleed ports 6 and 6' to the atmosphere, is kept at a minimum. The lower the rate of steam condensation may be kept the more will it be possible to economize on the amount of steam used to keep the cooking chamber at the desired cooking temperature.

Such steam as is condensed in the cooking chambers 8 and 8' is drained out through suitable condensate traps 14 and 14' and the food is kept out of contact with the bottom of the chambers by suitable supports or racks having perforations 12 so that the steam-air mixture may come into intimate contact with all sides of the food to be cooked. It is also desirable that the food be divided into small or thin portions and so spaced one part from the other that intimate contact with the heating medium may be insured.

In the embodiment of the invention shown by the Fig. V, the blower connections to the cooking chambers are reversed so that air is drawn through the cooking chamber by suction to produce pressures in the cooking chamber slightly less than atmospheric, instead of being delivered to the cooking chamber under pressures slightly greater than atmospheric as in Fig. I.

With valves 46 and 46' closed air is drawn in partly by steam jet entrainment and partly by blower suction to mix in chamber 30 and 30' with steam issuing from steam orifices 28 and 28' to produce the desired cooking temperature in cooking chambers 8 and 8', the mixture of steam and air then passing out through vent conduits 6 and 6' to conduit 98 and thence through blower inlet 41, blower 44 and out to atmosphere through fan outlet conduit 42.

Air inlet 91' into conduit 98 is of such a size that enough air is constantly allowed to pass through it to blower 44 that opening and closing of valves 46 and 46' will make no appreciable change in the suction pressure in conduit 98 and so also that steam passing through conduits 98 and 42 will be so diluted with air that it will be completely absorbed by the air and thus not appear at the blower outlet as visible steam.

With the suction in conduit 98 at essentially a constant pressure slightly less that atmospheric, the cooking temperature in cooking compartments 8 and 8' is determined at will by fixing the adjustments of valves 32 and 32'.

Likewise without disturbing the adjustments of valves 32 and 32', after once made to give the desired cooking temperature, any desired prewarming or afterwarming temperature may be produced by adjusting the degree of opening of valves 46 and 46' which control the amount of additional air that will be drawn into cooking compartments 8 and 8' through conduits 36 and 36' by pressures slightly less than atmospheric, which are produced by blower 44 through bleed conduits 6 and 6' and connecting conduit 98.

This embodiment requires for success that closure lids 4 and 4' fit reasonably pressure tight, so that essentially all air entering the cooking compartments 8 and 8' must pass through regulating valves 32, 32', 46 and 46', but it has an advantage over that shown by Figs. I and II in that the piping is simpler, which will be a decided advantage if it is desired to produce a cooker having a large number of cooking compartments.

It has the further advantage that all steam, heat and cooking odors arising from the apparatus may be piped through conduit 42 entirely outside the room in which the cooker is located and even if the conduit 42 discharges directly into the same room as the cooker the steam is diluted with such large volumes of room air that the heat is quickly dissipated and the steam itself is rendered invisible by being absorbed by the air to increase the humidity of the air slightly but not to saturate the air to its dew point.

If it is desired to preselect and to make the duration of the cooking period automatic, the automatic valve and timer of Fig. IV may be substituted for valves 46 and 46' of Fig. V as in Figs. I and II.

The best temperature for egg cooking is found to be 175° F. At this temperature it is found that an egg in its shell will be soft cooked (or "soft boiled") in six to eight minutes and hard cooked (or "hard boiled") in 40 to 45 minutes to produce a uniform jelly-like consistency in the white, substantially the same as that produced in well coddled eggs.

If, however, the eggs are broken into and cooked in shallow pans and are, also, first preheated to a temperature of about 125° F., the actual cooking time may be much shortened.

Likewise, meats cut in relatively thin slices may be cooked in a shorter time than larger cuts of meat. The advantages of cooking meats by the low-temperature method are too well known to need enumeration at this time but until my method of cooking, in which the pressure in the cooking chamber is essentially atmospheric and in which steam generated externally to the cooking chamber is the only source of heat is used, such methods as have so far been made available were not suitable for the relatively small and inexpensive apparatus such as is required for home use and for use in hotels, restaurants and soda fountains. This is especially true of apparatus for cooking eggs.

It will be manifest that the invention of this application may be realized in various forms and manners without departing from the spirit and scope of the claims.

What I claim is:—

1. A method of low-temperature steam cooking which comprises generating steam under controlled pressure greater than atmospheric, flowing a steady stream into intimate contact with the material to be cooked while concurrently inspirating a preselected portion of air into and mixing it with the steam prior to its contact with the material to be cooked to form a gaseous mixture of controlled temperature and thereafter continuously removing the gaseous mixture from such contact.

2. A method of low-temperature steam cooking which comprises continuously producing in a conduit associated with the cooking chamber a mixture of steam and air in preselected proportions and passing a stream of the gaseous mixture in intimate contact with the material to be cooked and thereafter removing the gaseous mixture continuously from such contact.

3. A method of low-temperature steam cooking which comprises continuously producing a mixture of steam and air in preselected proportions and passing a stream of the gaseous mixture at a regulated rate of flow in intimate contact with the material to be cooked while simultaneously maintaining the said material under a controlled pressure close to atmospheric and controlling the said pressure by regulation of the escape of the gaseous mixture from contact with the material being cooked.

4. A method of low-temperature steam cooking which comprises compressing an aeriform medium under controlled pressure greater than atmospheric, flowing a stream of this aeriform medium into intimate contact with the material to be cooked while concurrently inspirating a preselected portion of steam, generated at close to atmospheric pressure, into and mixing it with the aeriform medium prior to its contact with the material to be cooked to form a gaseous mixture of controlled temperature and thereafter removing the gaseous mixture continuously from such contact.

5. A method of low-temperature automatically-timed steam cooking which comprises continuously producing a mixture of steam and air in preselected proportions and passing a stream of the gaseous mixture at a regulated rate of flow in intimate contact with the material to be cooked while simultaneously maintaining the said material under a controlled pressure close to atmospheric by regulation of the escape of the gaseous mixture from contact with the material being cooked, the duration of the cooking operation being determined by preselecting by clock mechanism the time interval during which steam is allowed to pass mixed with air into contact with the material being cooked.

6. The art of cooking animal or vegetable substances which consists in enveloping said substance in a flowing stream of aerated steam, air and steam being premixed in preselected relative proportions and at a pressure only slightly greater than atmospheric, to give a prewarming temperature slightly less than that at which the substance starts active cooking, thereafter enveloping the material in a flowing stream of aerated steam, the air and steam being premixed at pressures only slightly greater than atmospheric in preselected relative proportions of steam and air to give a cooking temperature greater than the prewarming temperature but substantially below 212° F.

7. A method of low-temperature treating and processing of food materials which consists of first preheating the food to a low-temperature somewhat less than that necessary to start active cooking by producing continuously a mixture of steam and an aeriform medium in preselected proportions and passing a stream of the resulting gaseous mixture at a regulated rate of flow in intimate contact with the food material which is later to be cooked, while simultaneously maintaining the said material under a controlled pressure close to atmospheric and controlling the said pressure by regulating the escape of the gaseous mixture from contact with the material being preheated, thereafter subjecting the food to a cooking temperature substantially less than 212° F. by producing continuously a second mixture of steam and an aeriform medium in preselected proportions to give a mixture richer in steam than that produced during the preheating period and passing a stream of the second gaseous mixture at a regulated rate of flow in intimate contact with the material to be cooked, while simultaneously maintaining the said material under a controlled pressure close to atmospheric by regulation of the escape of the gaseous mixture from contact with the food material being cooked.

8. A method of automatically timed low-temperature treating and processing of food material which consists of first preheating the food material to a low-temperature somewhat less than that necessary to start active cooking by producing continuously a mixture of steam and an aeriform medium in preselected proportions and passing a stream of the resultant gaseous mixture at a regulated rate of flow in intimate contact with the food material which is later to be cooked, while simultaneously maintaining the said material under a controlled pressure close to atmospheric by regulating the escape of the gaseous mixture from contact with the material being preheated, thereafter subjecting the food to a cooking temperature substantially less than 212° F. by producing continuously a second mixture of steam and an aeriform medium in preselected proportions to give a mixture richer in steam than that produced during the preheating period and passing a stream of this second mixture at a regulated rate of flow in intimate contact with the material to be cooked, while simultaneously maintaining the said material under a controlled pressure close to atmospheric by regulating the escape of the gaseous mixture from contact with the food material being cooked, the duration of the preheating and cooking periods being determined by preselecting by clock mechanism the time intervals during which each of the two preselected mixtures of steam and the aeriform medium are allowed to flow in intimate contact with the food material being processed.

9. The art of cooking animal or vegetable substances which consists in enveloping said substance in a flowing stream of aerated steam, the air and steam being premixed in relative proportions at pressures only slightly greater than atmospheric to give a cooking temperature substantially less than 212° F., thereafter enveloping the cooked material in a second flowing stream of aerated steam, the air and steam being premixed at pressures only slightly greater than atmospheric and in such relative proportions of steam and air as to give a temperature below that at which active cooking of the substance may continue.

10. A method of low-temperature treating and processing of food matter which consists of first cooking the food matter at a temperature substantially less than 212° F. by producing a mixture of steam and an aeriform medium in preselected proportions and flowing a stream of the resultant gaseous mixture at a regulated rate of flow in intimate contact with the matter to be cooked, while simultaneously maintaining the food matter under a controlled pressure close to atmospheric by regulation of the escape of the gaseous mixture from contact with the food matter being cooked, thereafter subjecting the cooked food matter to a controlled temperature slightly less than its cooking temperature by producing a second mixture of steam and an aeriform medium in preselected proportions to give a mixture less rich in steam than that produced during the cooking period and passing a stream of the second gaseous mixture at a regulated rate of flow in intimate contact with the cooked food matter, while simultaneously maintaining the cooked food matter under a controlled pressure close to atmospheric by regulation of the escape of the gaseous mixture from contact with the food matter.

11. A method of automatically timed low-temperature treating and processing of food material which consists of first cooking the food material at a temperature less than 212° F. by producing a mixture of steam and an aeriform medium in preselected proportions and flowing a stream of the resultant gaseous mixture at a regulated rate of flow in intimate contact with the food material to be cooked, while simultaneously maintaining the food material under a controlled pressure close to atmospheric by regulation of the escape of the gaseous mixture from contact with the food material being cooked, thereafter subjecting the cooked food material to a controlled temperature slightly less than its cooking temperature by producing a second mixture of steam and an aeriform medium in preselected proportions to give a mixture less rich in steam than produced during the cooking period and passing a stream of the second gaseous mixture at a regulated rate of flow in intimate contact with the cooked food material, while simultaneously maintaining the cooked food material under a controlled pressure close to atmospheric by regulating the escape of the gaseous mixture from contact with the food material, the duration of the cooking period and the following low-temperature processing periods being determined by preselecting by clock mechanism the time intervals during which each of the two preselected mixtures of steam and the aeriform medium are allowed to flow in intimate contact with the food material.

12. The art of cooking animal or vegetable substances which consists in enveloping said substance in a flowing stream consisting of a gaseous mixture of an aeriform medium and steam the mixture of aeriform medium and steam being produced in a conduit adjacent to and connecting with the cooking chamber, this flowing stream being at a pressure approximately atmospheric and at a temperature substantially less than 212.

13. The art of prewarming animal or vegetable matter preparatory to low-temperature cooking which consists in enveloping said matter in a flowing stream consisting of a gaseous mixture of an aeriform medium and steam the mixture of aeriform medium and steam being produced in a conduit adjacent to and connecting with the cooking chamber, this flowing stream of gaseous mixture being at a pressure approximately atmospheric and at a temperature below that at which active cooking will start.

14. The art of keeping warm after low-temperature cooking of animal or vegetable matter preparatory to serving, which consists in enveloping said matter in a flowing stream consisting of a gaseous mixture of an aeriform medium and steam, this flowing stream of gaseous mixture being produced in a conduit adjacent to and connected with the cooking chamber and being at a pressure approximately atmospheric and at a temperature not greater than approximately 125° F.

15. A method of treating and conserving food matter which consists in cooking the same at a comparatively low-temperature by preselecting the requisite heat in an aerated steam vehicle premixed in a conduit adjacent to and connected with the cooking chamber and caused to flow in intimate contact with and over the food at approximately atmospheric pressure.

16. A method of low-temperature steam cooking which comprises continuously producing in a conduit associated with and connecting with the cooking chamber, a mixture of steam and air in preselected proportions, the proportions of steam and air being gauged by a temperature measuring thermometer placed in the direct path of the gaseous mixture flowing in the conduit and passing a stream of the gaseous mixture into intimate contact with the material to be cooked and thereafter removing the gaseous mixture continuously from such contact.

17. A method of low-temperature prewarming of food matter preparatory to cooking which comprises continuously producing in a conduit associated with and connecting with the cooking chamber a mixture of steam and air in preselected proportions, the proportions of steam and air being gauged by means of a temperature measuring thermometer placed in the direct path of the gaseous mixture flowing in the conduit, and passing a stream of the gaseous mixture into intimate contact with the material to be prewarmed and thereafter removing the gaseous mixture continuously from such contact.

18. A method of low-temperature after warming of food matter, preparatory to serving, which comprises continuously producing in a conduit associated with and connecting with the cooking chamber a mixture of steam and air in preselected proportions, the proportions of steam and air being gauged by means of a temperature measuring thermometer placed in the direct path of the gaseous mixture flowing in the conduit, and passing a stream of the gaseous mixture into intimate contact with the material to be afterwarmed and thereafter removing the gaseous mixture continuously from such contact.

BENJAMIN GREENFIELD.